United States Patent
Sagawa

(10) Patent No.: US 8,355,582 B2
(45) Date of Patent: Jan. 15, 2013

(54) IMAGE PROCESSING APPARATUS AND IMAGE PROCESSING METHOD

(75) Inventor: Naotsugu Sagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 356 days.

(21) Appl. No.: 12/844,641

(22) Filed: Jul. 27, 2010

(65) Prior Publication Data

US 2011/0033117 A1    Feb. 10, 2011

(30) Foreign Application Priority Data

Aug. 10, 2009 (JP) ................. 2009-186152

(51) Int. Cl.
*G06K 9/48* (2006.01)
(52) U.S. Cl. ......... 382/199; 356/237.1; 716/52; 702/35; 348/92
(58) Field of Classification Search .......... 382/100, 382/103, 141–152, 181, 190, 195, 199, 201, 382/203; 356/237.1–241.1; 716/51, 52, 716/110, 112; 702/35; 348/92
See application file for complete search history.

(56) References Cited

U.S. PATENT DOCUMENTS

| | | | | |
|---|---|---|---|---|
| 6,175,613 B1 * | 1/2001 | Boutenko et al. | ............ | 378/98.4 |
| 7,672,541 B2 * | 3/2010 | Gasparri et al. | ............. | 382/294 |
| 7,742,634 B2 * | 6/2010 | Fujieda et al. | ................ | 382/154 |
| 7,805,006 B2 * | 9/2010 | Katsuyama | .................... | 382/199 |
| 8,149,465 B2 * | 4/2012 | Maki | ............................ | 358/3.27 |
| 2007/0104357 A1 * | 5/2007 | Worster et al. | ................ | 382/149 |

FOREIGN PATENT DOCUMENTS

| | | | |
|---|---|---|---|
| JP | 7-72909 | A | 3/1995 |
| JP | 2766118 | B | 6/1998 |
| JP | 2985893 | B | 12/1999 |
| JP | 2002-175528 | A | 6/2002 |

* cited by examiner

*Primary Examiner* — Anand Bhatnagar
(74) *Attorney, Agent, or Firm* — Fitzpatrick, Cella, Harper & Scinto

(57) ABSTRACT

For each pixel of interest in a local region of an input image, an edge intensity in each of a plurality of predetermined directions is calculated. All directions in which the edge intensities are larger than an average value of the edge intensities are selected. For all pixels of interest in the local region, the edge intensities calculated for each of the selected directions are accumulated and output as an edge feature amount.

6 Claims, 11 Drawing Sheets

IMAGE PROCESSING APPARATUS AND IMAGE PROCESSING METHOD

BACKGROUND OF THE INVENTION

1. Field of the Invention

The present invention relates to a technique of extracting an edge feature amount from an image.

2. Description of the Related Art

There have been proposed techniques of extracting an edge feature from an image to detect an object in the image or the tilt of an electronic component, or determine defective and non-defective items. Japanese Patent Publication No. 07-072909 and Japanese Patent Laid-Open No. 2002-175528 propose techniques using, as an edge feature, an edge direction histogram obtained by accumulating edge intensities in each direction for each pixel of an image.

The edge direction histogram represents the cumulative feature in each edge direction within a predetermined region of an image, and can therefore accurately reflect the feature of an object without being affected by noise, unlike a method of directly detecting edge positions. The edge direction histogram calculation method will be described below.

FIG. 1 is a view for explaining a local region of an image and a pixel in the local region. Referring to FIG. 1, reference numeral 101 denotes an entire image; 102, a local region of the image 101; and 103, a pixel of interest in the local region 102. In FIG. 1, the edge intensity of the pixel 103 of interest in the horizontal direction is represented by Ih, and the edge intensity in the vertical direction as Iv. FIG. 2 is a view showing the pixel 103 of interest and eight pixels around it.

Under these circumstances, an edge intensity Fn in each direction is calculated concerning the pixel 103 of interest. There are eight edge directions d1 to d8, as shown in FIG. 2. In this case, the edge intensity Fn in each direction is calculated by $$Fn = Ih \times \sin\theta n + Iv \times \cos\theta n \quad (1)$$

| n | 1 | 2 | 3 | 4 | 5 | 6 | 7 | 8 |
|---|---|---|---|---|---|---|---|---|
| θn | 0° | 22.5° | 45° | 67.5° | 90° | 112.5° | 135° | 157.5° |

Next, the pixels in the local region 102 are scanned, as indicated by 302 in FIG. 3. Calculation processing based on equation (1) is performed for each pixel in the local region 102 defined as the pixel 103 of interest, thereby calculating edge intensities in the eight directions for each pixel.

Finally, the edge intensities of all pixels in the local region 102 are added for each direction to calculate the edge direction histogram in the local region 102. At this time, a method (conventional method A) disclosed in Japanese Patent No. 02766118 or a method (conventional method B) disclosed in Japanese Patent No. 02985893 is used. The conventional method A adds only an edge intensity in a direction in which the edge intensity is maximum to the edge direction histogram. The conventional method B adds the edge intensities in all eight directions to the edge direction histogram. FIG. 3 shows an example 301 of an edge direction histogram calculated in this way. The thus calculated histogram will be referred to as a "local region edge histogram" hereinafter.

In the above-described method, the number of edge directions of the pixel of interest is eight, and edge intensities in the eight directions are always calculated for each pixel. However, there also exists a method of calculating only an edge intensity in one direction. In this case, an edge intensity d and an edge direction θ are calculated by $$d = \sqrt{(Ih)^2 + (Iv)^2} \quad (2)$$

$$\theta = \arctan(Iv/Ih) \quad (3)$$

A case wherein a detection target has a nonlinear contour, for example, the edge feature of a shoulder portion in person detection will be described below. In an image 400 of a person shown in FIG. 4, reference numeral 401 indicates a region around a shoulder of the person. The region 401 is enlarged in FIG. 4. Reference numeral 403 represents the distribution of edge intensities F1 to F8 in the eight directions calculated using equation (1) for a pixel 402 of interest in the region 401. Note that the distribution 403 is obtained for one pixel, and called a "pixel edge histogram".

As is apparent from the distribution 403, the edge intensity of the pixel 402 of interest is maximum in the direction d7. However, the edge intensities are high in the near directions d6, d8, and d1 as well. In fact, the edge of a human shoulder portion exhibits not a linear contour, i.e., an edge intensity extremely high in one direction but a round contour. For this reason, it is assumed possible to correctly reflect the feature of the contour shape of a detection target by obtaining feature amounts in a plurality of directions in which the edge intensities are high rather than by obtaining an edge intensity only in one direction as an edge feature.

In the conventional method A, only the maximum edge intensity in a direction, i.e., the direction d7 in this case is acquired as a feature amount, and added to the local region edge histogram. The pieces of edge intensity information in the directions other than d7 are discarded. As described above, if the detection target has a linear shape, the edge feature can sufficiently be reflected by the conventional method A. However, if the detection target is a nonlinear object such as a person or a car, the edge feature cannot sufficiently be reflected.

On the other hand, the conventional method B adds the edge intensities in all the eight directions to the local region edge histogram. In this case, edge intensities are added even for directions with low edge intensities such as the directions d2, d3, and d4. If the edge intensities in such directions with low edge intensities are added, the distribution of the local region edge histogram exhibits intensities to some degree even for these directions. For this reason, the degree of enhancement in the edge directions (d1, d6, d7, and d8 in the example of FIG. 4), which originally reflect the feature, may decrease.

FIG. 5 is a view showing a local region edge histogram 501 calculated by the conventional method A, and a local region edge histogram 502 calculated by the conventional method B. In the local region edge histogram 501, the edge intensity in the direction d7 is extremely enhanced relative to those in the remaining directions. However, in the local region edge histogram 502, the degree of enhancement of the intensity in the direction d7 is lower than those in the remaining directions.

SUMMARY OF THE INVENTION

The present invention has been made in consideration of the above-described problems, and provides a technique of, when calculating, as a feature amount, the gradient intensity distribution for each gradient direction in a local region, acquiring a feature amount that correctly reflects the feature in the local region even if the contour is not linear.

According to the first aspect of the present invention, an image processing apparatus comprising: a calculation unit which calculates, for each of pixels of interest in a local region within an input image, an edge intensity in each of a plurality of predetermined directions; a selection unit which selects, out of the plurality of directions, all directions in which the edge intensities calculated by the calculation unit satisfy a predetermined condition concerning a statistic of the edge intensity for each of the pixels of interest; an accumulation unit which accumulates, for all pixels of interest in the local region, the edge intensities calculated by the calculation unit for each of the directions selected by the selection unit; and a unit which outputs, as an edge feature amount in the local region, a cumulative edge intensity value for each of the plurality of predetermined directions obtained by the accumulation unit.

According to the second aspect of the present invention, an image processing method comprising the steps of: calculating, for each of pixels of interest in a local region within an input image, an edge intensity in each of a plurality of predetermined directions; selecting, out of the plurality of directions, all directions in which the edge intensities calculated in the calculating step satisfy a predetermined condition concerning a statistic of the edge intensity for each of the pixels of interest; accumulating, for all pixels of interest in the local region, the edge intensities calculated in the calculating step for each of the directions selected in the selecting step; and outputting, as an edge feature amount in the local region, a cumulative edge intensity value for each of the plurality of predetermined directions obtained in the accumulating step.

Further features of the present invention will become apparent from the following description of exemplary embodiments with reference to the attached drawings.

DESCRIPTION OF THE EMBODIMENTS

An embodiment of the present invention will now be described with reference to the accompanying drawings. Note that the embodiment to be described below is an example of detailed practice of the present invention, and one of detailed examples of arrangements defined in the scope of claims.

First Embodiment

Figure 1:
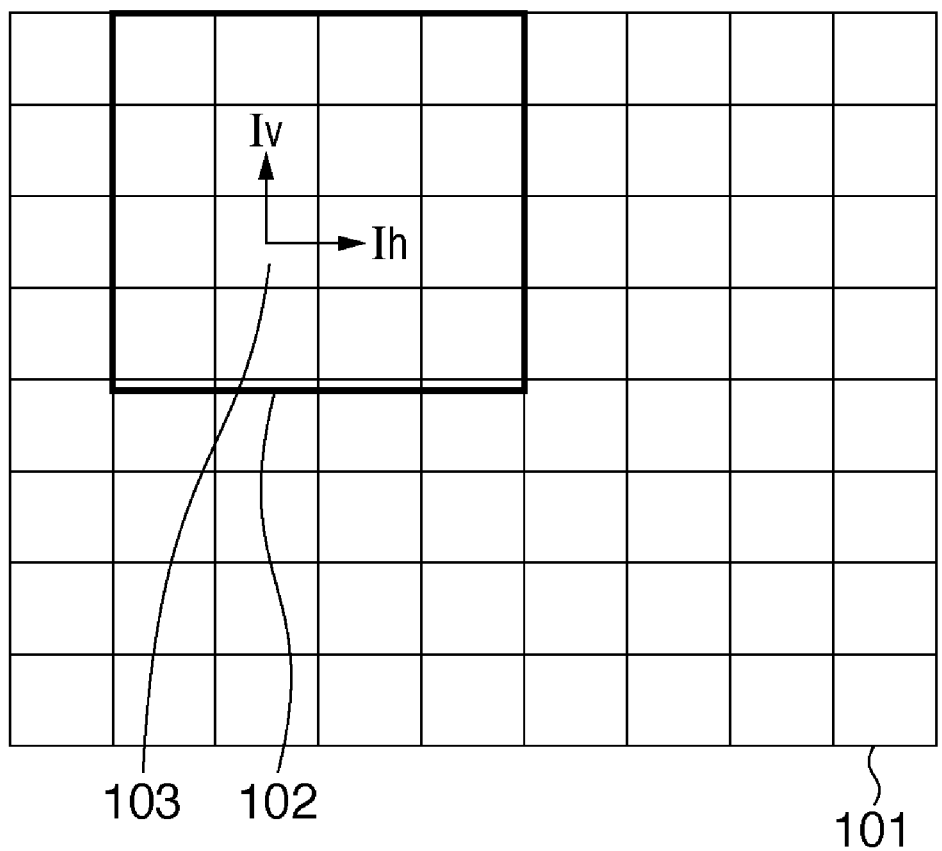
FIG. 1 is a view for explaining a local region of an image and a pixel in the local region.
Figure 2:
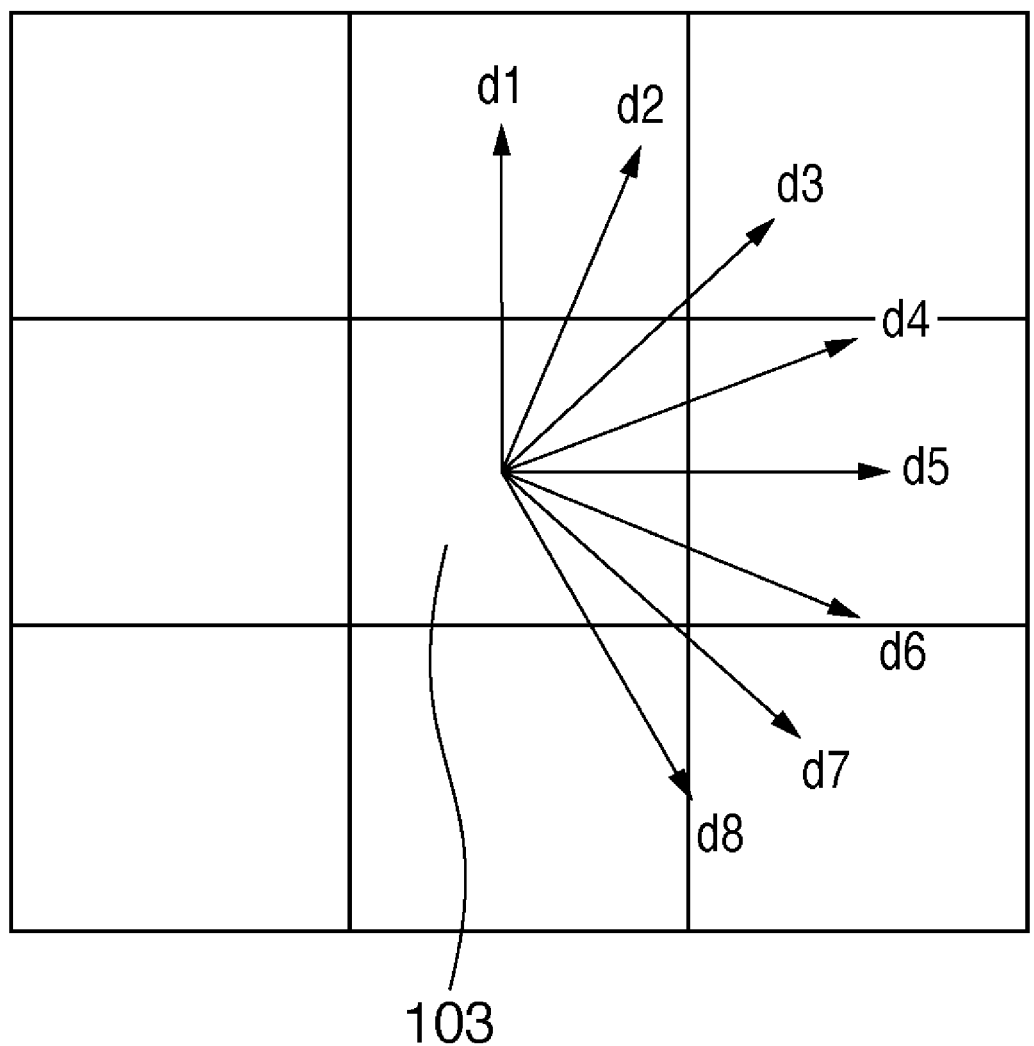
FIG. 2 is a view showing a pixel 103 of interest and eight pixels around it.
Figure 3:
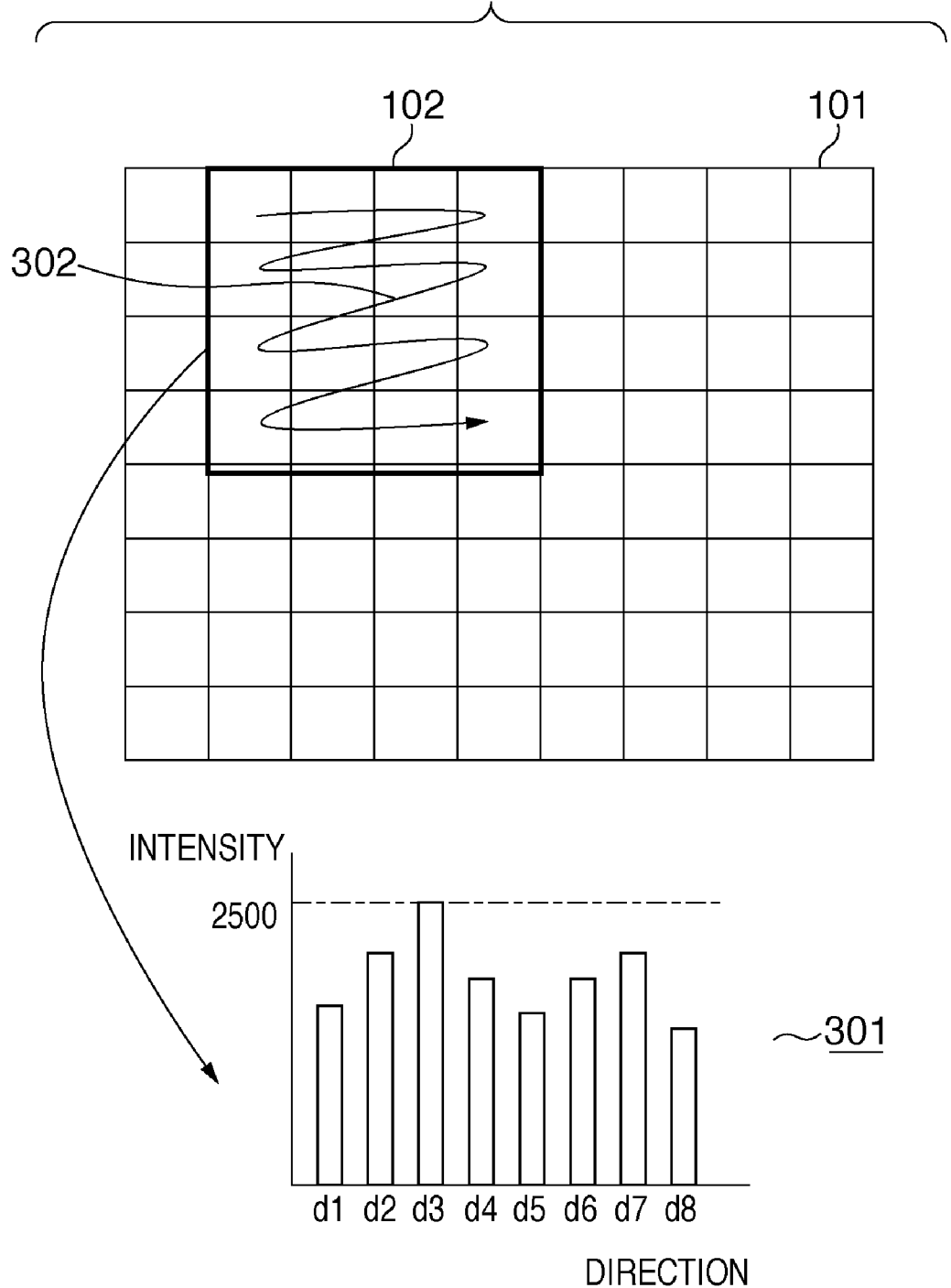
FIG. 3 is a view for explaining processing of obtaining an edge direction histogram.
Figure 4:
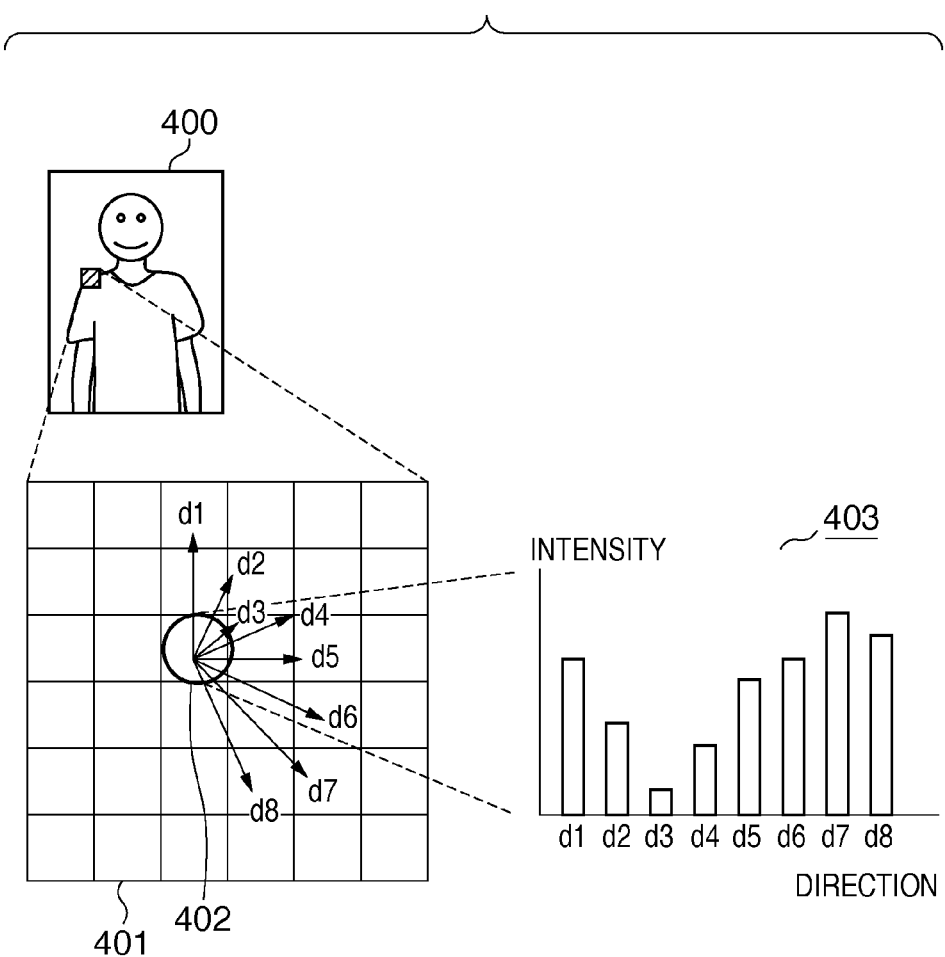
FIG. 4 is a view for explaining a pixel edge histogram when a detection target has a nonlinear contour.
Figure 5:
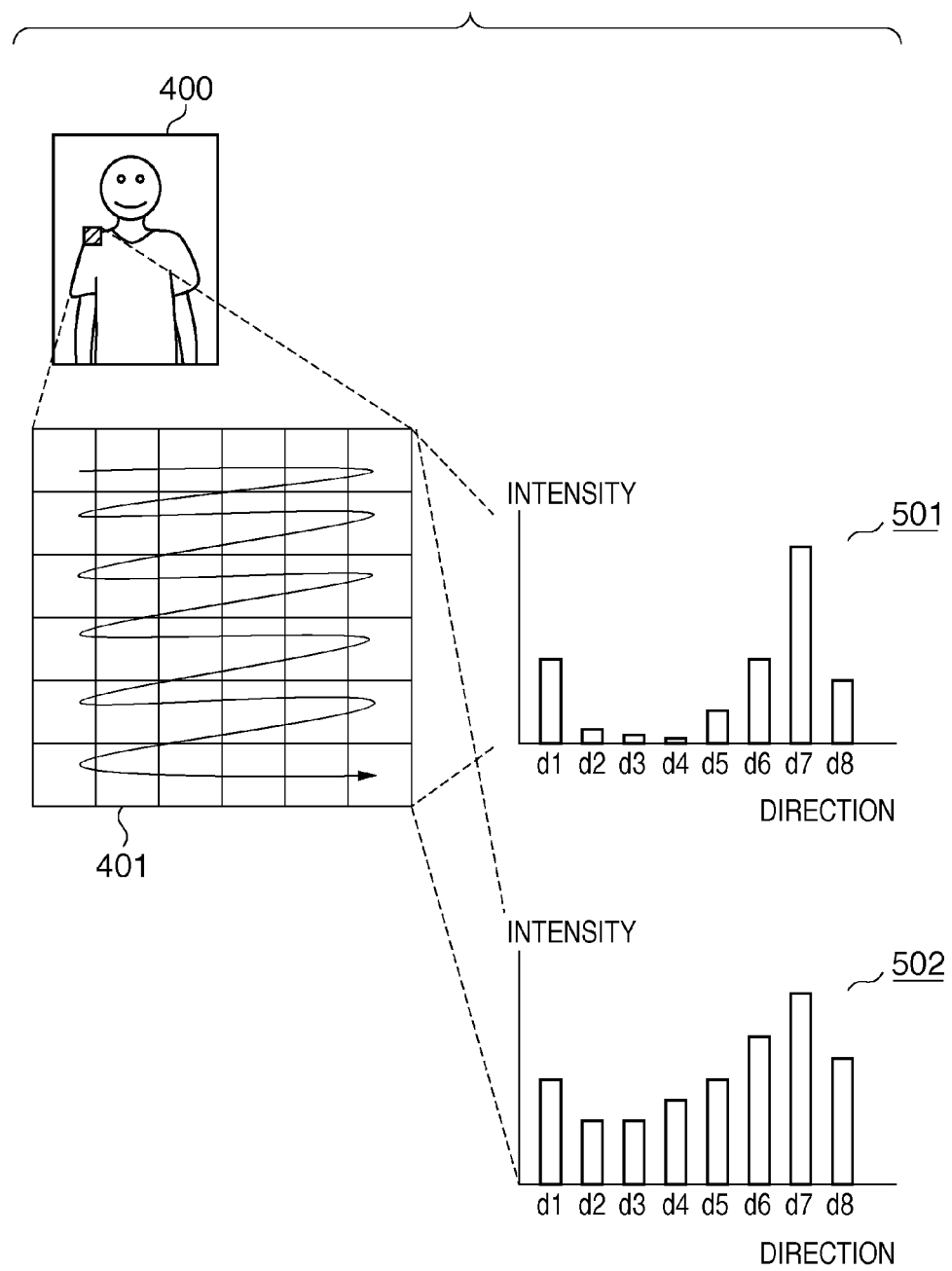
FIG. 5 is a view showing local region edge histograms calculated by conventional methods.
Figure 6:
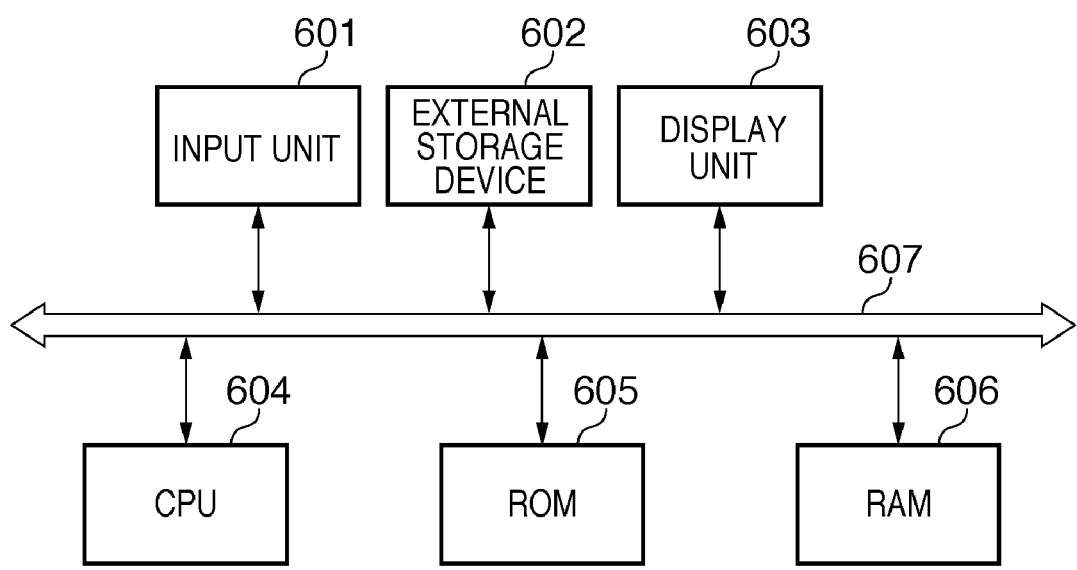
FIG. 6 is a block diagram showing an example of the hardware configuration of an image processing apparatus.

In this embodiment, the pixel edge histogram of each pixel is analyzed, and only edge intensities in directions with edge intensities more than the average are added to the local region edge histogram. FIG. 6 is a block diagram showing an example of the hardware configuration of an image processing apparatus according to this embodiment.

A CPU 604 controls the entire image processing apparatus using computer programs and data stored in a ROM 605 and a RAM 606, and executes each processing (to be described later) of the image processing apparatus.

The ROM 605 stores, e.g., the setting data and boot program of the image processing apparatus. The RAM 606 is an example of a computer-readable storage medium, and has an area to temporarily store computer programs and data loaded from an external storage device 602 and a work area to be used by the CPU 604 to execute various kinds of processing. That is, the RAM 606 can provide various kinds of areas as needed.

An input unit 601 includes a mouse and a keyboard. A user can input various instructions to the CPU 604 by operating the input unit 601. A display unit 603 is formed from a CRT or a liquid crystal panel to display a result of processing by the CPU 604 as an image or a text.

The external storage device 602 is another example of the computer-readable storage medium, which is a mass storage device represented by a hard disk drive. The external storage device 602 stores the OS (Operating System), and computer programs and data to be used to cause the CPU 604 to execute each processing (to be described later) of the image processing apparatus. The computer programs and data stored in the external storage device 602 are loaded to the RAM 606 as needed under the control of the CPU 604 and processed by the CPU 604.

A bus 607 connects the above-described units. Note that the arrangement of an apparatus applicable to the image processing apparatus according to the embodiment is not limited to that shown in FIG. 6, and various other arrangements are considerable.

Figure 7:
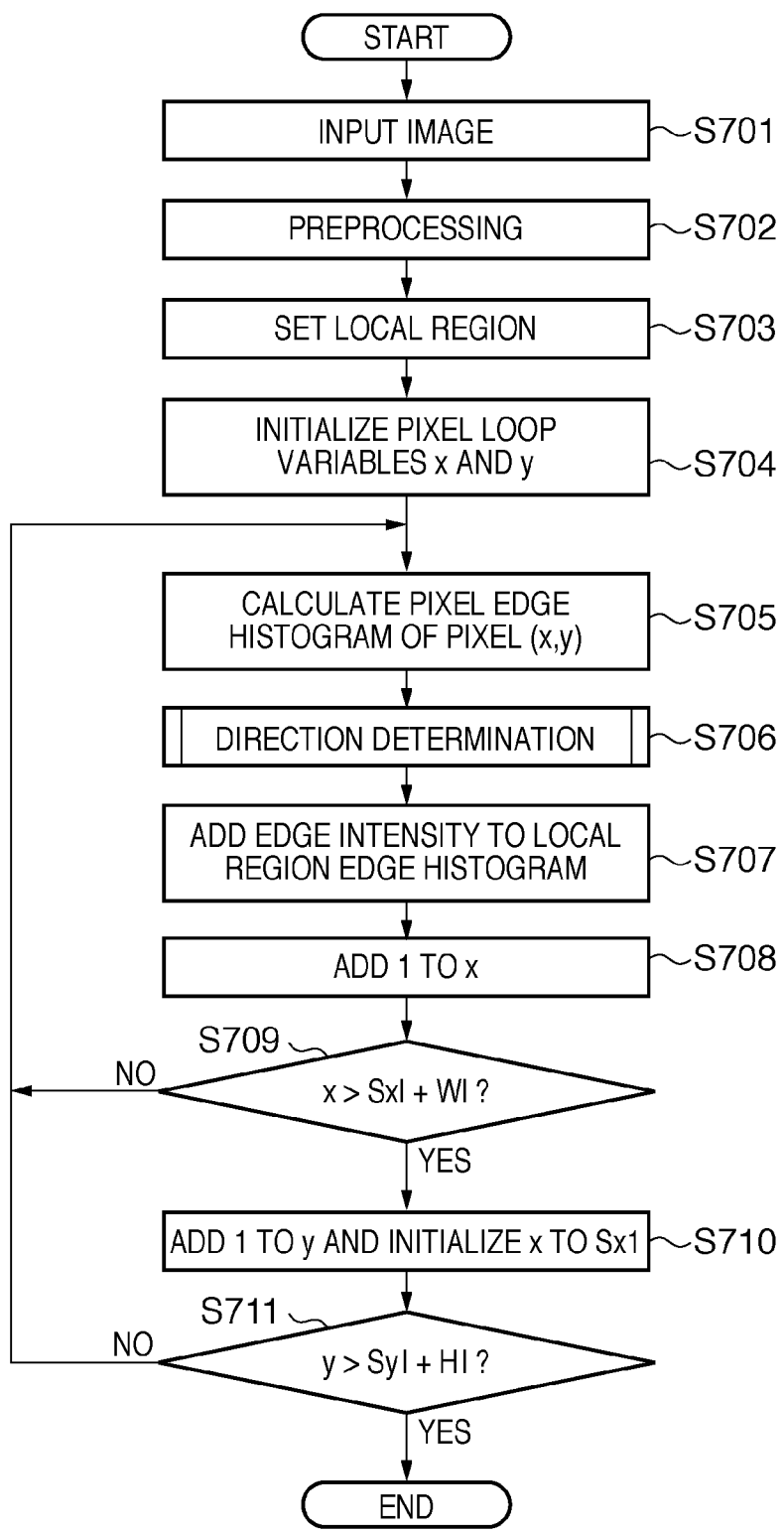
FIG. 7 is a flowchart illustrating processing of extracting an edge feature amount from a local region of one image.

Processing of extracting an edge feature amount from a local region of one image will be described next with reference to the flowchart of the processing shown in FIG. 7. Note that computer programs and data to be used to cause the CPU 604 to execute the processing according to the flowchart of FIG. 7 are stored in the external storage device 602. The CPU 604 reads out the programs and data to the RAM 606 and executes them. The image processing apparatus according to this embodiment thus functions to execute each processing to be described below.

First, in step S701, the CPU 604 loads an image stored in the external storage device 602 to the RAM 606. Note that the manner to acquire the image to the RAM 606 is not limited to this. The image may be acquired from an external device to the RAM 606 via a network. Alternatively, an image created by an application in the apparatus may directly be used in the subsequent processing. In this embodiment, the image acquired to the RAM 606 in step S701 is assumed to be a color image including pixels formed from R, G, and B chrominance signals.

In step S702, the CPU 604 converts the image acquired to the RAM 606 in step S701 into a gray image as preprocessing of the image. Letting R, G, and B be the color components of the color image, and Y be the color component of the gray image, the conversion processing is implemented by performing, for each pixel of the color image, calculation processing according to $$Y = 0.299 \times R + 0.587 \times G + 0.114 \quad (4)$$

Note that the image acquired in step S701 need not always be a color image. For this reason, it is necessary to determine before step S702 whether the image acquired in step S701 is a color image. If the image is acquired by a digital camera, the determination can be done by analyzing the data format and referring to color information. If the image is acquired by a scanner, the determination can be done by referring to the scan condition set by the user. The image generated in step S702 will be referred to as an input image hereinafter.

Figure 8:
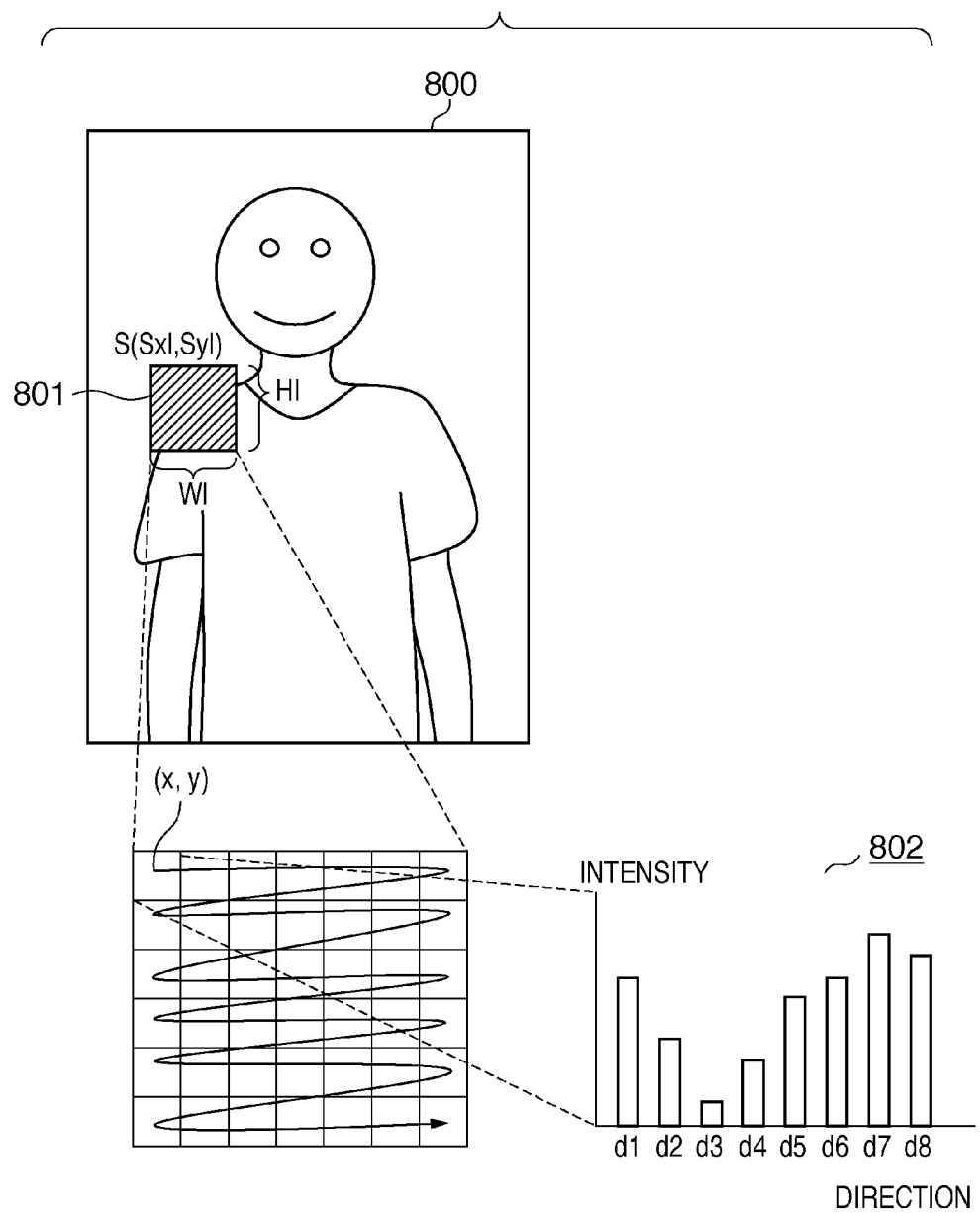
FIG. 8 is a view for explaining a local region.

In step S703, the CPU 604 sets a local region for the input image. FIG. 8 is a view for explaining a local region set in this embodiment. Referring to FIG. 8, reference numeral 800 denotes an input image generated in step S702; and 801, a local region set for the input image 800 in step S703. The coordinate values of the upper left corner of the local region 801 are (Sx1,Sy1). The height is H1 (=6), and the width is W1 (=6). Note that the local region can be set either by the user via the input unit 601 or by the CPU 604 using predetermined region information (for example, the above-described coordinate values, height, and width).

In step S704, the CPU 604 initializes a variable x representing an x coordinate value in the local region to Sx1 and a variable y representing a y coordinate value in the local region to Sy1. That is, in this initialization, the position represented by the variables x and y is initialized to the position of the upper left corner of the local region.

In step S705, the CPU 604 creates the pixel edge histogram of the pixel (pixel of interest) at the position (x,y) of the input image generated in step S702. More specifically, an edge intensity Fn (n=1 to 8) of the pixel of interest in each of eight directions d1 to d8 is calculated, as described above. Fn indicates the edge intensity in a direction dn.

To calculate the edge intensity Fn, a method of applying eight kinds of mask patterns to the eight pixels around the pixel of interest, like a method disclosed in Japanese Patent No. 02985893, can be used as well as the above-described methods. Referring to FIG. 8, reference numeral 802 denotes an example of a pixel edge histogram that represents the edge intensities F1 to F8 obtained for the eight directions d1 to d8. In this embodiment, the eight directions are defined as the "predetermined number of directions". However, any other number of directions may be defined as the "predetermined number of directions".

In step S706, the CPU 604 calculates the average value of the edge intensities F1 to F8 obtained in step S705, and selects at least one direction out of the directions d1 to d8 based on the calculated average value. The processing in this step will be described later in detail.

In step S707, the CPU 604 adds the edge intensity calculated in step S705 for the direction selected in step S706 to edge intensities previously calculated for the direction concerning other pixels of interest, thereby updating the cumulative edge intensity value for the direction. In other words, for only the direction selected in step S706, the corresponding edge intensity is added to the local region edge histogram.

In step S708, the CPU 604 adds 1 to the variable x. In step S709, to determine whether the x coordinate value represented by the variable x updated in step S708 passes the right edge of the local region, the CPU 604 determines whether $$x > Sx1 + W1 \quad (5)$$

is satisfied.

Upon determining that the condition is satisfied, the process advances to step S710. Upon determining that the condition is not satisfied, the process returns to step S705 to repeat the processing from then on while defining the pixel on the right side of the immediately preceding pixel of interest as a new pixel of interest.

In step S710, the CPU 604 adds 1 to the variable y, and initializes the variable x to Sx1. In step S711, to determine whether the y coordinate value represented by the variable y updated in step S710 passes the lower edge of the local region, the CPU 604 determines whether $$y > Sy1 + H1 \quad (6)$$

is satisfied.

Upon determining that the condition is satisfied, the processing ends. Upon determining that the condition is not satisfied, the process returns to step S705 to repeat the processing from then on while defining the pixel at the left end of the line next to the line of the immediately preceding pixel of interest as a new pixel of interest.

Figure 9:
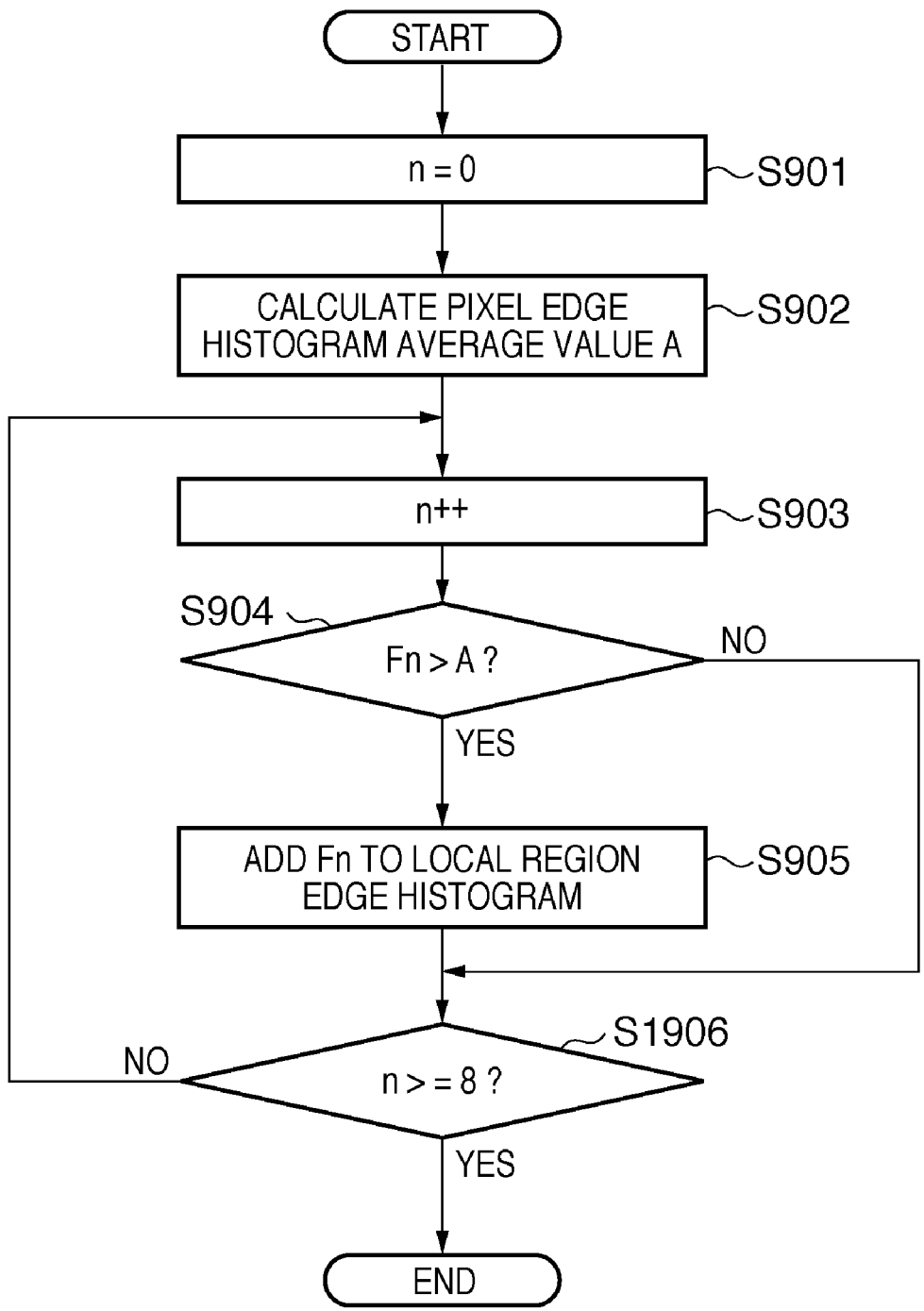
FIG. 9 is a flowchart illustrating details of processing of determining a direction to add an edge intensity.

The processing in step S706 will be described next. In step S706, out of the eight directions for which the edge intensities have been obtained, a direction with a relatively higher edge intensity is selected to correctly represent the edge feature of the pixel of interest. To do this, in this embodiment, the average (average intensity) of the edge intensities F1 to F8 calculated for the eight directions is calculated, and a direction in which an edge intensity more than the average intensity has been obtained is selected. Only the edge intensity in the selected direction is added to the corresponding cumulative edge intensity in the local region edge histogram. FIG. 9 is a flowchart illustrating details of the processing in step S706.

First, in step S901, the CPU 604 initializes a variable n to 0. In step S902, the CPU 604 calculates an average (average intensity) A of the edge intensities F1 to F8 obtained for the eight directions in step S705 by $$A = \frac{1}{8}\sum_{n=1}^{8} Fn \quad (7)$$

In step S903, the CPU 604 adds 1 to the variable n. In step S904, to determine whether the edge intensity Fn in the direction dn is higher than the average intensity A, the CPU 604 determines whether $$Fn > A \quad (8)$$

is satisfied.

Upon determining that the condition is satisfied, the process advances to step S905. Upon determining that the condition is not satisfied, the process advances to step S1906. In step S905, the CPU 604 adds the edge intensity Fn to the "cumulative edge intensity for the direction dn" registered in the local region edge histogram, thereby updating the cumulative edge intensity.

On the other hand, in step S1906, to determine whether all the edge intensities F1 to F8 have been compared with the average intensity A, the CPU 604 determines whether $$n \geq 8 \quad (9)$$

is satisfied.

Figure 10A:
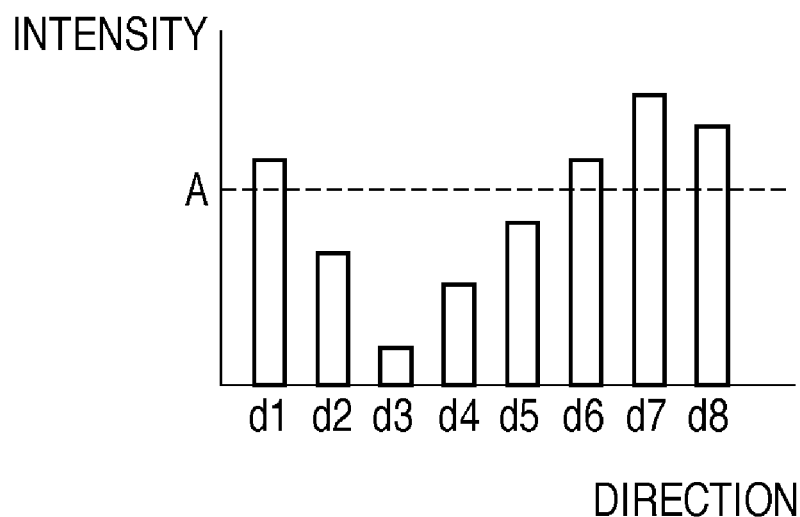
FIGS. 10A and 10B are views showing examples of pixel edge histograms.

Upon determining that the condition is satisfied, the processing according to the flowchart shown in FIG. 9 ends, and the process advances to step S707 of FIG. 7. Upon determining that the condition is not satisfied, the process returns to step S903 to repeat the processing from then on. This allows to add and register only the edge intensity more than the average intensity A to the local region edge histogram. For example, if a pixel edge histogram shown in FIG. 10A is obtained for a pixel of interest, the edge intensities F1, F6, F7, and F8 in the directions d1, d6, d7, and d8 can be added to the local region edge histogram.

Note that the local region edge histogram obtained by the above-described processing is output to the external storage device 602 as the edge feature amount in the local region. However, the output destination of the local region edge histogram is not particularly limited. It may be output to an external device via a network. Alternatively, after the local region edge histogram is obtained, the local region edge histogram may be applied to various kinds of processing.

In the above description, a direction in which an edge intensity more than the average intensity has been obtained is selected. However, the direction selection method is not limited to this. For example, the threshold of edge intensity to be used to select the direction need not always be the average itself. It may be, for example, 1.2 or 0.8 times larger than the average.

The statistic to be used as the reference need not always be the average value of all edge intensities but can be the maximum value, and in this case, the threshold may be, for example, 0.6 times larger than the maximum value. In short, when obtaining the edge feature, all edge intensities whose levels can be a feature in the distribution of edge intensities in the directions are used, and remaining edge intensities are not used.

According to the above-described embodiment, when obtaining the edge feature amount of a local region, it is possible to reflect even an edge intensity of sufficient level other than the maximum edge intensity, and avoid the influence of a low edge intensity that is not characteristic.

Second Embodiment

Figure 10B:
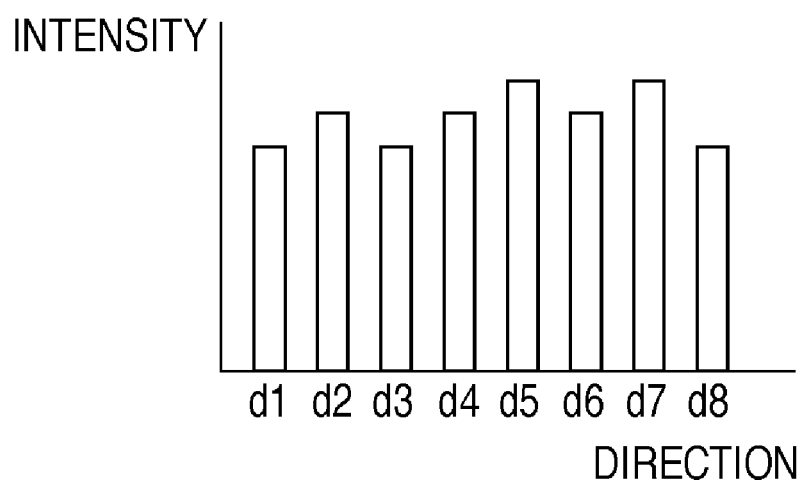

In the first embodiment, only edge intensities more than the threshold based on the average intensity or maximum intensity are added to the local region edge histogram. However, when the distribution of the pixel edge histogram has, for example, almost the same edge intensities in all directions, as shown in FIG. 10B, i.e., when the variance of edge intensities is small, adding the edge intensities in all directions to the local region edge histogram is appropriate to represent the feature of a pixel. In the second embodiment, the average value and variance value are used as the statistic of edge intensities F1 to F8, and based on them, the target to be added to the local region edge histogram is determined in the edge intensities F1 to F8. That is, in this embodiment, a method different from that of the first embodiment will be described as the method of selecting, out of the predetermined number of directions, a direction in which the statistic of the edge intensity satisfies a predetermined condition.

Figure 11:
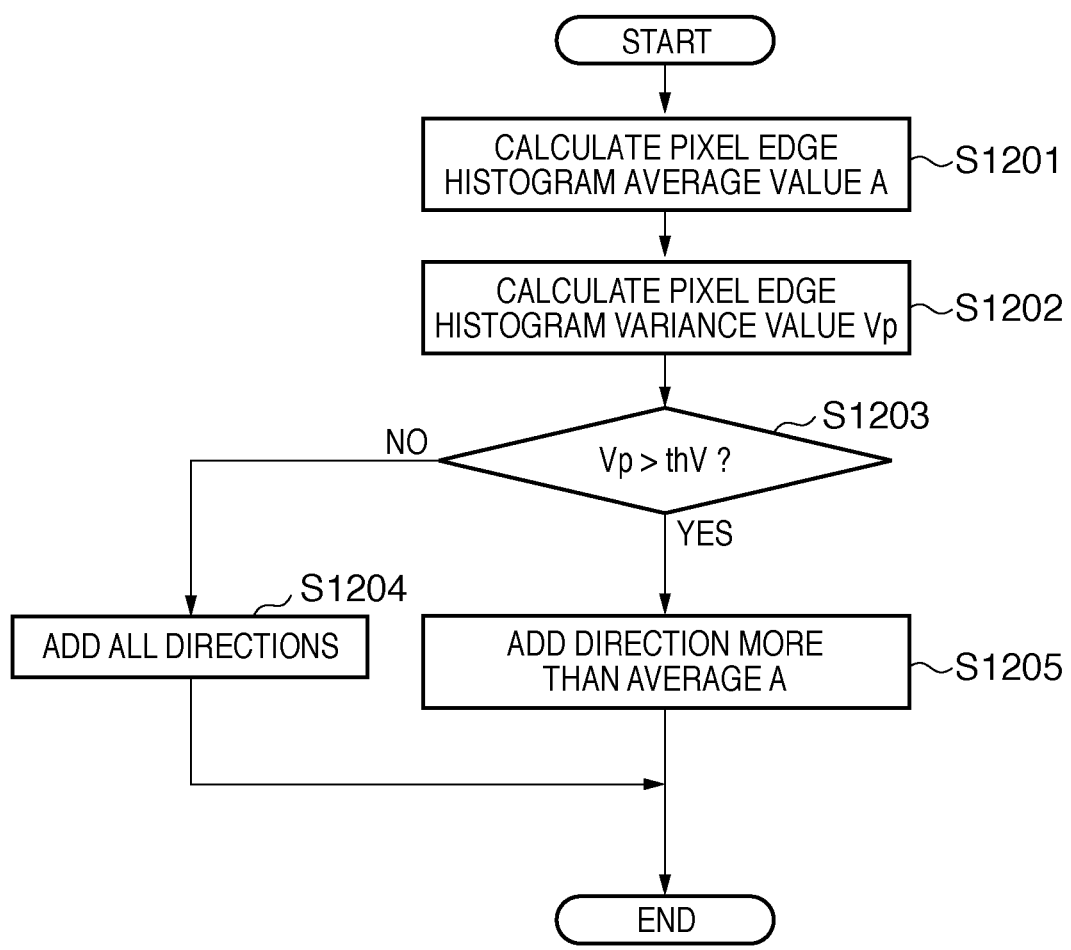
FIG. 11 is a flowchart illustrating processing of determining a direction to add an edge intensity according to the second embodiment.

Note that in this embodiment, only the above-described processing in step S706, i.e., processing of determining the direction of the edge intensity to be added to the local region edge histogram is different from the first embodiment. The remaining parts are the same as in the first embodiment. Hence, only the processing performed in step S706 of this embodiment will be described. FIG. 11 is a flowchart of the processing performed in step S706 of this embodiment.

In step S1201, an average intensity A is obtained as the average value of the edge intensities F1 to F8 in accordance with the same procedure as the processing in step S902. Next, in step S1202, a variance value Vp of the edge intensities F1 to F8 is obtained by $$Vp = \frac{1}{8}\sum_{n=1}^{8}(Fn - A)^2 \quad (10)$$

In step S1203, to determine whether the variance value Vp is larger than a preset threshold thV, the CPU determines whether $$Vp > thV \quad (11)$$

is satisfied.

Upon determining that the condition is satisfied (the variance value is larger than the threshold), the process advances to step S1205. Upon determining that the condition is not satisfied (the variance value is equal to or smaller than the threshold), the process returns to step S1204. In step S1205, only edge intensities more than the average intensity A are added to the corresponding cumulative edge intensity, as in the first embodiment. On the other hand, in step S1204, all the edge intensities F1 to F8 are added to the corresponding cumulative edge intensity.

With the above-described processing, the edge intensities to be added to the local region edge histogram are determined in accordance with the average value and variance value of the edge intensities. If a pixel have high edge intensities only in several directions, as shown in FIG. 10A, only the edge intensities in those directions are added to the local region edge histogram. If the edge intensities are almost the same in all directions, as shown in FIG. 10B, the edge intensities in all directions are added to the local region edge histogram.

Note that in the above-described embodiments, the edge intensities are obtained by defining each pixel in the local region as a pixel of interest. However, the pixel of interest may be extracted by sampling the pixels in the local region at an appropriate interval.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-186152 filed Aug. 10, 2009, which is hereby incorporated by reference herein in its entirety.

What is claimed is:
1. An image processing apparatus comprising:
a calculation unit which calculates, for each of pixels of interest in a local region within an input image, an edge intensity in each of a plurality of predetermined directions;
a selection unit which selects, out of the plurality of directions, all directions in which the edge intensities calcu- lated by the calculation unit satisfy a predetermined condition concerning a statistic of the edge intensity for each of the pixels of interest;

an accumulation unit which accumulates, for all pixels of interest in the local region, the edge intensities calculated by the calculation unit for each of the directions selected by the selection unit; and a unit which outputs, as an edge feature amount in the local region, a cumulative edge intensity value for each of the plurality of predetermined directions obtained by the accumulation unit.

2. The apparatus according to claim 1, wherein the selection unit obtains, as the statistic, an average value of the edge intensities obtained by the calculation unit for the directions, and selects a direction corresponding to an edge intensity larger than a reference value based on the obtained average value.

3. The apparatus according to claim 1, wherein the selection unit obtains, as the statistic, a maximum value of the edge intensities obtained by the calculation unit for the directions, and selects a direction corresponding to an edge intensity larger than a reference value obtained by multiplying the obtained maximum value by a predetermined ratio.

4. The apparatus according to claim 1, wherein the selection unit obtains, as the statistic, an average value and a variance value of the edge intensities obtained by the calculation unit for the directions, selects a direction corresponding to an edge intensity larger than a reference value based on the average value if the variance value is larger than a threshold, and selects all of the plurality of predetermined directions if the variance value is not larger than the threshold.

5. An image processing method comprising the steps of:

calculating, for each of pixels of interest in a local region within an input image, an edge intensity in each of a plurality of predetermined directions;

selecting, out of the plurality of directions, all directions in which the edge intensities calculated in the calculating step satisfy a predetermined condition concerning a statistic of the edge intensity for each of the pixels of interest;

accumulating, for all pixels of interest in the local region, the edge intensities calculated in the calculating step for each of the directions selected in the selecting step; and outputting, as an edge feature amount in the local region, a cumulative edge intensity value for each of the plurality of predetermined directions obtained in the accumulating step.

6. A computer-readable storage medium storing a computer program which causes a computer to function as each unit of an image processing apparatus of claim 1.

* * * * *